(12) United States Patent
Bell (10) Patent No.: US 12,509,018 B2
(45) Date of Patent: Dec. 30, 2025

(54) SYSTEMS AND METHODS FOR PREVENTING CAR THEFT

(71) Applicant: Ava-Elizabeth Francis Bell, Ravenna, OH (US)

(72) Inventor: Ava-Elizabeth Francis Bell, Ravenna, OH (US)

(*) Notice: Subject to any disclaimer, the term of this patent is extended or adjusted under 35 U.S.C. 154(b) by 170 days.

(21) Appl. No.: 18/316,581

(22) Filed: May 12, 2023

(65) Prior Publication Data

US 2024/0375608 A1    Nov. 14, 2024

(51) Int. Cl.
| | |
|---|---|
| *B60R 25/01* | (2013.01) |
| *B60J 3/04* | (2006.01) |
| *B60R 25/24* | (2013.01) |
| *G02F 1/163* | (2006.01) |

(52) U.S. Cl.
CPC ............... *B60R 25/01* (2013.01); *B60J 3/04* (2013.01); *B60R 25/24* (2013.01); *G02F 1/163* (2013.01); *B60R 2325/205* (2013.01)

(58) Field of Classification Search
CPC ... B60R 25/01; B60R 25/24; B60R 2325/205; B60J 3/04; G02F 1/163
USPC ...................................................... 340/426.2
See application file for complete search history.

(56) References Cited

U.S. PATENT DOCUMENTS

| | | | |
|---|---|---|---|
| 6,276,821 B1 * | 8/2001 | Pastrick | B60R 1/1207 362/144 |
| 8,781,676 B2 | 7/2014 | Mcintyre et al. | |
| 10,359,681 B2 * | 7/2019 | Brown | G02F 1/1523 |
| 2008/0129446 A1 * | 6/2008 | Vader | E05B 83/12 340/5.6 |
| 2012/0019891 A1 * | 1/2012 | Dewell | G02F 1/163 359/275 |

(Continued)

FOREIGN PATENT DOCUMENTS

| | | | | |
|---|---|---|---|---|
| CN | 202110977244.5 | * | 8/2021 | |
| WO | WO-2004040886 A1 | * | 5/2004 | G06F 21/35 |

OTHER PUBLICATIONS

Compustar, "About Compustar Car Alarms", https://www.compustar.com/systems/security/about-car-alarms, 2023 (7 pages).

(Continued)

*Primary Examiner* — Omar Casillashernandez
(74) *Attorney, Agent, or Firm* — Wilmer Cutler Pickering Hale and Dorr LLP (57) ABSTRACT

Methods and systems are disclosed for receiving, by a receiver, a first signal sent from a remote access device; and, in response to the receiver receiving the first signal, causing, by a processor, an electrochromic device of a vehicle windshield to be in a turned-on state. A transmitter sends a second signal to a remote authenticator device, the second signal triggering a response signal from the remote authenticator device. The receiver receives the response signal. In response to the response signal indicating an authorization the processor causes the electrochromic device to be in the turned-on state. In response to the response signal indicating no authorization, the processor causes the electrochromic device to be in a turned-off state. Sometimes the electrochromic device is turned-on when, in addition to receiving the first signal, the receiver receives the response signal from the remote authenticator device indicating an authorization.

20 Claims, 6 Drawing Sheets

(56) References Cited

U.S. PATENT DOCUMENTS

| | | | |
|---|---|---|---|
| 2012/0287496 A1* | 11/2012 | Nagel | H02M 7/217 |
| | | | 359/267 |
| 2013/0171375 A1 | 7/2013 | Yu | |
| 2013/0258436 A1* | 10/2013 | Podbelski | C03C 17/32 |
| | | | 359/893 |
| 2015/0142206 A1* | 5/2015 | Pierce | B60R 16/02 |
| | | | 348/148 |
| 2019/0346742 A1* | 11/2019 | Cammenga | G02F 1/133528 |
| 2021/0240046 A1* | 8/2021 | Saenger Nayver | G02F 1/1514 |
| 2023/0097149 A1* | 3/2023 | Akre | H04L 63/083 |
| | | | 359/625 |
| 2023/0114568 A1* | 4/2023 | Carter | B60J 7/068 |
| | | | 296/100.05 |
| 2024/0248374 A1* | 7/2024 | Han | G02F 1/163 |
| 2024/0311795 A1* | 9/2024 | Adcock | B60K 35/00 |

OTHER PUBLICATIONS

Smart Tint, "Smart Tint Automotive Applications for cars, vans, buses, trucks, and more", https://shop.smarttint.com/Automotive_c_315.html, 2023 (16 pages).

* cited by examiner

SYSTEMS AND METHODS FOR PREVENTING CAR THEFT

TECHNICAL FIELD

The present invention relates generally to preventing unauthorized use or theft of vehicles, and more particularly to vehicle security systems that may work in combination with remote access devices, such as key fobs, smart phones, and/or any other suitable remote access device.

BACKGROUND

Modern automobiles contain electronic control units and sensors connected to networks for security features in response to vehicle theft problems. For instance, in the United States, there was an average of 816,819 car thefts per year from 2016-2019. This increased by over 10% in 2020, and as of October 2021, the NICB (National Insurance Crime Bureau) reported car thefts spiking nationwide due to high demand and low supply. To enhance vehicle security against thefts, car alarms can be installed to create noise and/or to otherwise draw attention to a potential theft.

In connection with electronic controls, mechanical and/or electrical locking devices are sometimes utilized as part of the security solution to vehicle theft issues. Example locking devices include brake locks, steering wheel locks, tire clamps, etc. An alternative security solution is using ignition interlock systems which can prevent a vehicle's engine from being started when armed due to security breaches.

In recent years, there have been studies in search for new mechanisms for improving vehicle security against increasing vehicle thefts. Accordingly, new systems and methods for preventing vehicle thefts are desirable.

SUMMARY

In one embodiment, a security control system comprises a remote access device configured to send a first signal, a receiver configured to receive the first signal, and a processor in communication with the receiver, wherein the processor is configured to cause an electrochromic device of a vehicle windshield to be in a turned-on state in response to the receiver receiving the first signal. In some examples, the first signal is configured to indicate that the remote access device is within a predetermined proximity range of the receiver. In other examples, the processor is disposed near a dashboard of a vehicle.

In some examples, the electrochromic device is an electrochromic film device. In other examples, the electrochromic device can be built in an optically transparent material, for instance, glass.

In another embodiment, the security control system further comprises a transmitter configured to send a second signal to a remote authenticator device, the second signal triggering a response signal from the remote authenticator device, wherein, when the receiver receives the response signal indicating an authorization, the processor is configured to cause the electrochromic device to be in the turned-on state. In some examples, when the receiver receives the response signal indicating no authorization, the processor is configured to cause the electrochromic device to be in a turned-off state. In other examples, the processor is configured to cause the electrochromic device to be in the turned-on state when, in addition to receiving the first signal, the receiver receives the response signal from the remote authenticator device indicating an authorization. Otherwise, the processor is configured to cause the electrochromic device to remain in the turned-off state.

In a further embodiment, the processor is further configured to cause a power supply device to be connected to the electrochromic device, the electrochromic device configured to be in the turned-on state when connected to the power supply device. In some examples, when the receiver receives the response signal indicating no authorization, the processor is further configured to cause the power supply device to shut down. In other examples, the electrochromic device is in the turned-off state when the power supply device is shut down.

In yet another embodiment, a control method comprises receiving, by a receiver, a first signal sent from a remote access device; and, in response to the receiver receiving the first signal, causing, by a processor, an electrochromic device of a vehicle windshield to be in a turned-on state. In some examples, the first signal is configured to indicate that the remote access device is within a predetermined proximity range of the receiver. In other examples, the processor is disposed near a dashboard of a vehicle.

In yet another embodiment, the control method further comprises sending, by a transmitter, a second signal to a remote authenticator device, the second signal triggering a response signal from the remote authenticator device; receiving, by the receiver, the response signal; in response to the response signal indicating an authorization, causing, by the processor, the electrochromic device to be in the turned-on state; and, in response to the response signal indicating no authorization, causing, by the processor, the electrochromic device to be in a turned-off state. In other examples, the processor is configured to cause the electrochromic device to be in the turned-on state when, in addition to receiving the first signal, the receiver receives the response signal from the remote authenticator device indicating an authorization. Otherwise, the processor is configured to cause the electrochromic device to remain in the turned-off state.

In a further embodiment, the control method further comprises causing, by the processor, a power supply device to be connected to the electrochromic device, the electrochromic device configured to be in the turned-on state when connected to the power supply device. In some examples, when the receiver receives the response signal indicating no authorization, the control method further comprises causing, by the processor, the power supply device to shut down. In other examples, the electrochromic device is in the turned-off state when the power supply device is shut down.

In yet another embodiment, a vehicle security system comprises a vehicle start device configured to cause, when in an activated state, a vehicle engine to start; a control device in communication with the vehicle start device, the control device being powered up by the vehicle start device in the activated state; an electrochromic device of a vehicle windshield and in communication with the control device, the electrochromic device configured to be in a turned-off state when the control device is not powered up; and a remote access device configured to send a first signal. The control device is configured to check for the first signal sent from the remote access device, and when the control device receives the first signal, change the electrochromic device in the turned-off state to a turned-on state. In some examples, the first signal is configured to indicate that the remote access device is within a predetermined proximity range of the receiver.

In a further embodiment, the control device is further configured to, when the control device does not receive the first signal, send a second signal to a remote authenticator device, the second signal triggering a response signal from the remote authenticator device; receive the response signal; in response to the response signal indicating an authorization, change the electrochromic device from the turned-off state to the turned-on state; and in response to the response signal indicating no authorization, maintain the electrochromic device in the turned-off state. In other examples, the processor is configured to cause the electrochromic device to be in the turned-on state when, in addition to receiving the first signal, the receiver receives the response signal from the remote authenticator device indicating an authorization. Otherwise, the processor is configured to cause the electrochromic device to remain in the turned-off state.

In a further embodiment, the control device further comprising a power supply device in connection with the electrochromic device, wherein the electrochromic device is configured to be in the turned-on state when the power supply device is powered up by the vehicle start device in the activated state. In some examples, when the receiver receives the response signal indicating no authorization, the control device is further configured to cause the vehicle start device to shut down to be in a deactivated state.

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

As tools for improving vehicle security against thefts, mechanical locks like brake locks, tire clamps, and steering wheel locks require time consuming setup with each use and are inconvenient to store when not in use. In other use case scenarios, sensor-controlled alarms only create noise to draw attention to a potential theft, but do not effectively prevent a vehicle from being stolen.

In recent years, a type of smart glass has been developed and its transparency can be adjusted by changing electric current based on the characteristics of the liquid crystal materials arranged inside. In some embodiments of the subject matter that systems and methods disclosed by the current application are directed at, a smart film structure is attached to transparent glass directly. The film structure can change the transparency state of the glass freely with the advantages of blocking sight from both outside and inside viewers. When there is no electricity going through the film, the liquid crystals in the film are all unorganized and aligned to different directions. As a result, the light going at the film would reflect or bounce off such that the film appears opaque. When there is electricity going through, the liquid crystals are all aligned in the same direction, allowing the light to pass through and making the film appear transparent. In some examples, the film structure forms an electrochromic film device. In other examples, an electrochromic device can be built in an optically transparent material, for instance, glass. In view of the foregoing description of the smart film structure, systems and methods disclosed by the current application use an electrochromic device (e.g., an electrochromic film device) to make the front windshield of a protected vehicle opaque, preventing an unauthorized person from seeing out the windshield to drive the vehicle even if the unauthorized person is able to enter the vehicle. Electrochromic films contain polymer-dispersed liquid crystals ("PDLC") and have been used to develop adjustable privacy glass and privacy window films. The electrochromic film appears opaque without electricity running through it and turns transparent with electricity running through it. The current disclosure embodies methods and systems that utilize and control the electrochromic film in security and/or anti-theft applications.

In one embodiment, a PDLC film device is a three-dimensional structures composed by liquid crystal micro drops dispersed in a polymer matrix. As a result, the PDLC film device can be switched electrically between light scattering and transparent states. In a non-limiting example, flexible polyester ("PET") film with conductive material can be coated by a layer of indium tin oxide ("ITO") film. The percentage of conductive material and PET film quality are relevant in making PDLC film device of good quality with high transmittance and resistance to shocks. The liquid crystal is sandwiched between the 2 ITO films by a lamination machine to make the PDLC film device.

In one embodiment, a sheet of material containing electrochromic film is applied and attached to cover the entirety of a front windshield of a vehicle. The engine of the vehicle can provide electricity power supply to the electrochromic film through an electrical circuitry. When the vehicle is operated by a user normally, the engine of the vehicle is running, thereby providing electrical energy that flows through the electrochromic film attached to the vehicle's front windshield. As a result, the electrochromic film is operated in a turned-on state which allows visible light through the electrochromic film. In turn, normal visibility is allowed through the glass of the front windshield. By contrast, when the engine of the vehicle is not running, there is no electrical energy flowing through the electrochromic film so the electrochromic film is operated in a turned-off state. As a result, the electrochromic film turns opaque not allowing most of the visible light through. Thus, the visibility through the glass of the front windshield is obscured.

In some implementations, the electrochromic film is applied and attached to all glass areas of all windows of the vehicle. When not supplied by electricity power supply, the opaque electrochromic film in the turned-off state blocks visibility from both inside and outside of the vehicle. Therefore, the electrochromic film helps reduce smash-and-grab robbery by preventing a person from being able to see inside of the vehicle while the vehicle is turned off.

In other implementations, the electrochromic film applied and attached to all glass areas of all windows of the vehicle is used to reduce heat absorbed by the vehicle while the vehicle is turned off and parked in an open high-temperature environment. Similarly, in an open low-temperature environment, the electrochromic film is used to reduce heat radiation out from inside of the vehicle. In other implementations, the electrochromic film is designed with graphical or textual patterns, providing venues for advertisement opportunities and/or artistic presentations.

In another embodiment, the electrochromic film applied and attached to the front windshield of a vehicle is controlled by electrical circuits, data processing apparatus (e.g., a programmable processor, a microcontroller, a computer, or multiple computers), in combination with a multi-factor authentication ("MFA") mechanism using computing hardware and/or software. When a regular key is used to turn on the operation of a vehicle, a primary module (e.g., a vehicle start system, an engine starter circuit, and the like) allows operation of the engine of the vehicle and powers up other components of the vehicle. A secondary module (e.g., a security control system, etc.) is also connected to and powered up by the primary module. The secondary module is electrically connected to the electrochromic film and is operable to control electrical power to the electrochromic film. In some implementations, the secondary module is installed in the vehicle near the vehicle's steering wheel and dashboard. In other implementations, the MFA mechanism is implemented with the processor to control the vehicle without using any electrochromic device. For instance, the processor can control the MFA mechanism with other vehicle enablement device (e.g., an ignition interlock device). In further implementations, the MFA mechanism involves using a biometric device (e.g., a fingerprint scanner, a retinal scanning device, etc.).

In some embodiments, before the vehicle is started by the regular key, the electrochromic film is not yet powered up by the secondary module, which is in turn not yet powered up by the primary module. As a result, there is no electrical energy flowing through the electrochromic film so it is in a turned-off state being opaque whereby visibility through the electrochromic film is obscured. After the regular key is used to turn on the operation of the vehicle and the primary module is powered up, the secondary module is in turn powered up. The secondary module then checks whether a remote access device (e.g., a key fob, etc.), which has been paired with the secondary module, is within a predetermined proximity range of the secondary module. If the remote access device is successfully found to be in the predetermined proximity range of the secondary module, the secondary module is operable to turn on the electrochromic film. Hence, the electrochromic film is in a turned-on state allowing electricity to flow through to the electrochromic film. As a result, the electrochromic film turns transparent and visibility through the electrochromic film is allowed. If the remote access device is not found to be in the predetermined proximity range, the secondary module does not turn on the electrochromic film thereby leaving the film opaque whereby visibility through the electrochromic film is obscured.

In some implementations, the secondary module also controls a disablement circuit (e.g., a kill switch, etc.) and/or the primary module to shut down the engine of the vehicle. As a result, the electrochromic film remains in the turned-off state being opaque.

In other implementations, instead of or in addition to checking whether the remote access device is within a predetermined proximity range, the secondary module sends a message to a remote authenticator device (e.g., a cell phone with an authenticator application installed on the cell phone, etc.), which has been set up to verify the identity the person having possession of the remote authenticator device (e.g., the owner of the vehicle and/or authorized persons). The message is used to check with the person using the remote authenticator device whether the activity of starting the engine of the vehicle is authorized. If the person using the remote authenticator device replies with an affirmative response, the secondary module receives a signal indicating the affirmative response and proceeds to turn on the electrochromic film. If the person using the remote authenticator device replies with a negative response, the secondary module receives a signal indicating the negative response and turns off the electrochromic film and/or keeps the electrochromic film in the turned-off state. If no response is received from the remote authenticator device with a predetermined period of time, then the secondary module turns off the electrochromic film and/or keeps the electrochromic film in the turned-off state In further implementations, the secondary module performs the multi-factor authentication check procedure described in the foregoing paragraph even when the remote access device is successfully found to be in the predetermined proximity range. In any case, the multi-factor authentication aids in preventing relay theft and triggers a kill switch if other authentication mechanisms fail.

Systems and methods disclosed in the current application provide extra layers of security against thefts. For example, equipment and functions like a starter-kill switch can prevent a vehicle targeted by unauthorized persons from being driven when a security system is armed and/or a security alarm is triggered. However, this security feature can be defeated by physical removal and/or tampering of the armed equipment. To the contrary, if the secondary module as described in foregoing paragraphs is physically removed and/or tampered, then there is no mechanism to deliver electrical power to the electrochromic film. Hence, the electrochromic film will remain opaque, and the security measure stays in effect.

Figure 1:
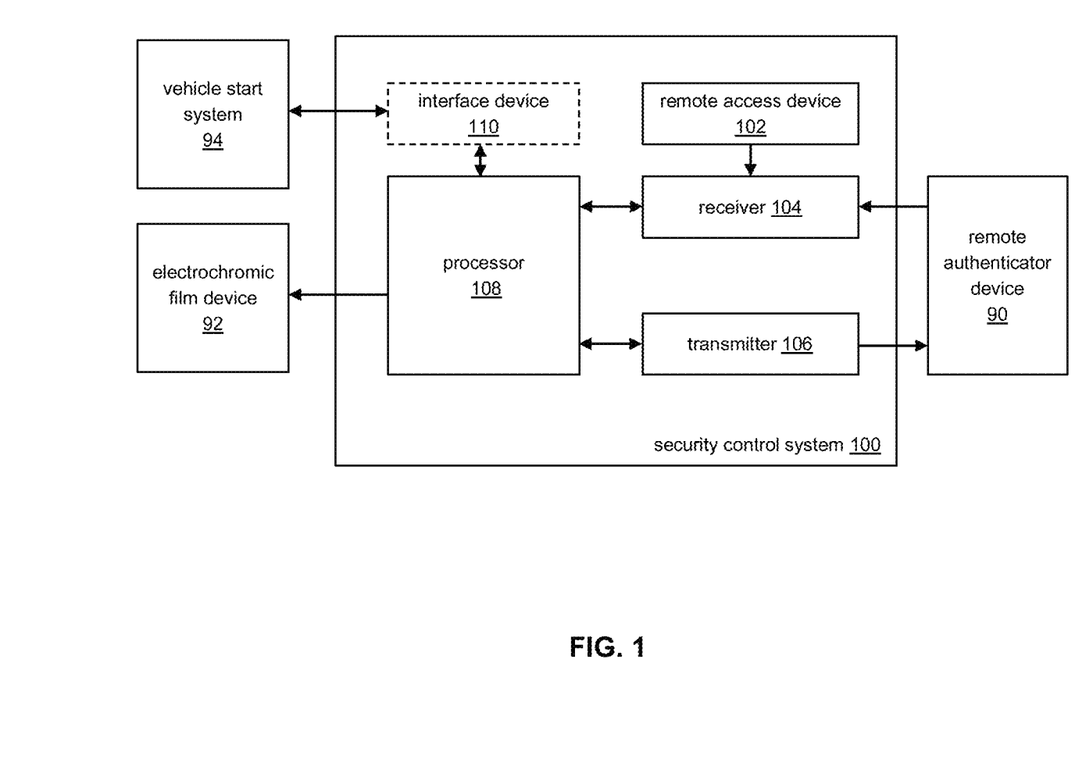
FIG. 1 is a block diagram illustrating an exemplary system for vehicle security control, in accordance with some embodiments.

FIG. 1 illustrates an exemplary security control system 100 in communication with a remote authenticator device 90, an electrochromic film device 92, and a vehicle start system 94. In this illustrated example, the security control system 100 includes a remote access device 102, a receiver 104, a transmitter 106, and a processor 108. In some implementations, the security control system 100 further includes an interface device 110. The processor 108 is in communication with the receiver 104, the transmitter 106, and the interface device 110.

Figure 5A:
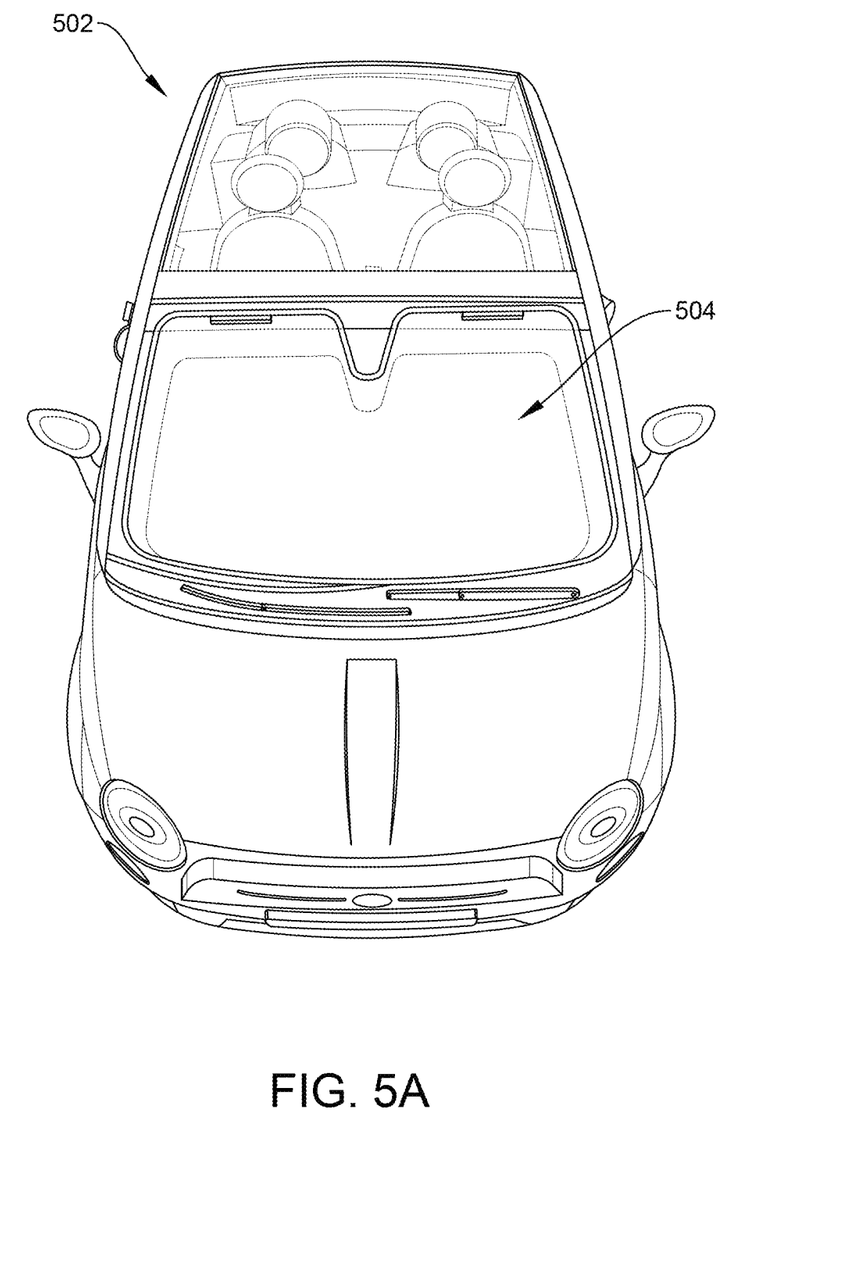
FIGS. 5A-5B are simplified diagrams illustrating an exemplary implementation of vehicle security devices, in accordance with some embodiments.
Figure 5B:
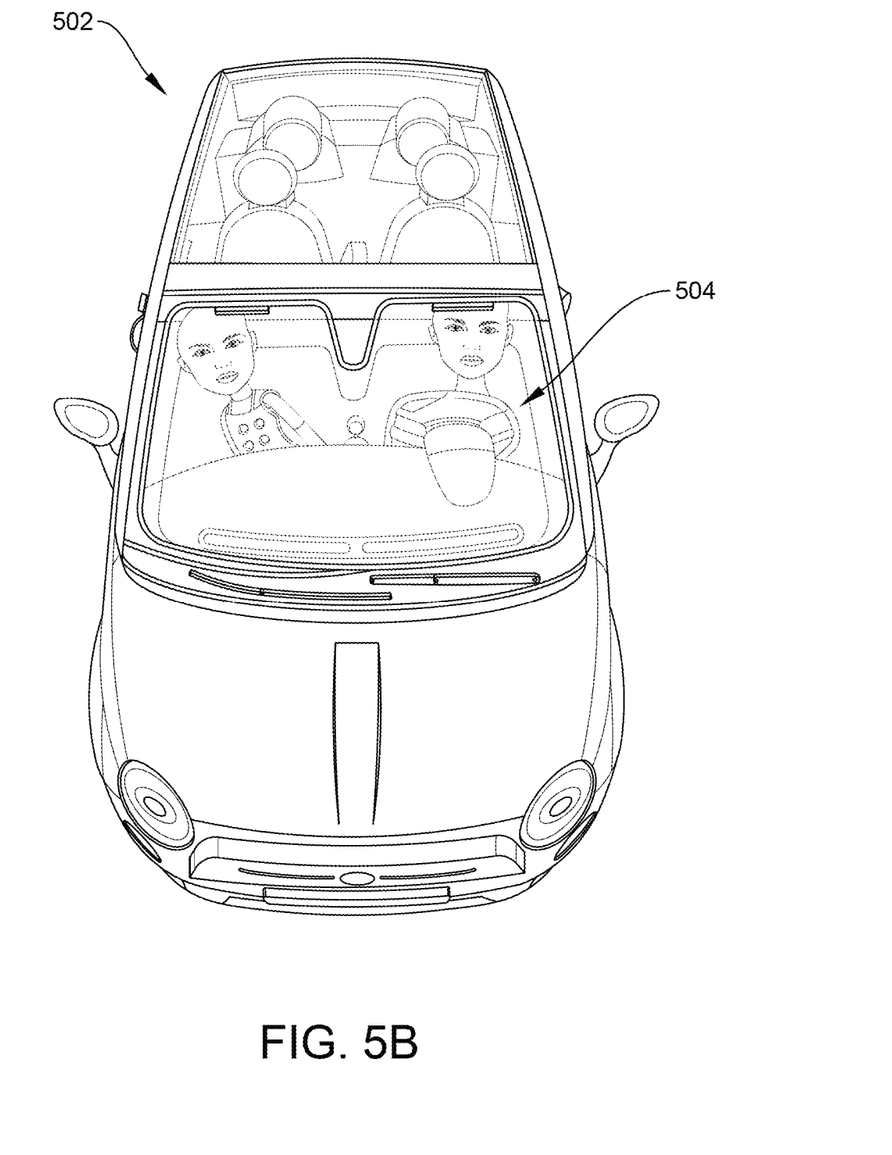

In various implementations, the electrochromic film device 92 can be applied and attached to any one and/or various combinations of vehicle windows (e.g., front windshield, rear window, side window, and sunroof window, etc.). For example, the electrochromic film device 92 can be applied to the front windshield as depicted in FIGS. 5A and 5B.

The remote access device 102 is configured to be paired with the receiver 104. After the pairing process is complete, the remote access device 102 is configured to send a first signal identifying and/or locating the remote access device 102. Examples of the remote access device 102 include a key fob, a smart phone, etc. The receiver 104 is configured to detect the first signal if, for example, the remote access device 102 is within a predetermined proximity range of the receiver 104. Alternatively or in addition, the remote access device 102 may send a first signal in response to input from a user using the remote access device 102. In response to receiving the first signal, the receiver 104 communicates to the processor 108 that it has received the first signal.

In some implementations, the processor 108, in response to the receiver 104 receiving the first signal, controls the electrochromic film device 92, which is in an initial turned-off state, to change to a turned-on state. In some implementations, the processor 108 instead controls the transmitter 106 to send a second signal to the remote authenticator device 90. Examples of the authenticator device 90 include a cell phone with an authenticator application installed on the cell phone, a handheld electronic pendant, etc. The second signal triggers the remote authenticator device 90 to prompt a question for the user of the remote authenticator device 90 to choose a response. For instance, the prompt asks the user whether the current activity regarding operations of the vehicle armed with the security control system 100 is authorized. A response signal indicating the user's response, or an absence of a response after a predetermined period of time, is sent from the remote authenticator device 90 back to the receiver 104.

When the receiver 104 receives the response signal from the remote authenticator device 90, the receiver 104 is configured to communicate to the processor 108 the user's response indicated by the response signal. When the response signal received by the receiver 104 indicates a first response state (e.g., an affirmative response from the user, an authorization, etc.), the processor 108 controls the electrochromic film device 92 to change from the turned-off state to the turned-on state. When the response signal received by the receiver 104 indicates a second response state (e.g., a negative response from the user or no response from the user, no authorization, etc.), the processor 108 controls the electrochromic film device 92 to remain in the turned-off state. In some examples, when the response signal received by the receiver 104 indicates a second response state (e.g., a negative response from the user, no authorization, etc.), the processor 108 controls the electrochromic film device 92 to change from the turned-on state to the turned-off state.

In another embodiment, by operation of the processor 108, a power supply device is connected to the electrochromic film device 92 providing electricity power. In various implementations, the power supply device is disposed in various locations. (e.g., in the security control system 100 or outside of the security control system 100, etc.) In another example, the power supply device is disposed in the vehicle start system 94 and is in connection with the interface device 110. The power supply device provides electricity power to the receiver 104, the transmitter 106, and the processor 108. In the other direction, when the receiver 104 receives the response signal indicating the second response state (e.g., no authorization, etc.), the processor 108 controls, via the interface device 110, the power supply device of the vehicle start system 94 to shut down. As a result, the electrochromic film device 92 is kept in the turned-off state while the vehicle start system 94 is shut down.

In yet another embodiment, the receiver 104, the transmitter 106, and the processor 108 are integrated on a circuit board (e.g., a printed circuit board ("PCB")). In various implementations, the circuit board is disposed in various locations. For instance, the circuit board is disposed near the dashboard of a vehicle.

Examples of the processor 108 include microprocessor or microcontroller, such as a Renesas R5F3650NDFB or similar device. Such a microprocessor or microcontroller operates to execute programs stored in memory devices that can be reprogrammed. Generally, a processor will receive instructions and data from a read only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry (e.g., FPGAs or ASICs, etc.).

Figure 2:
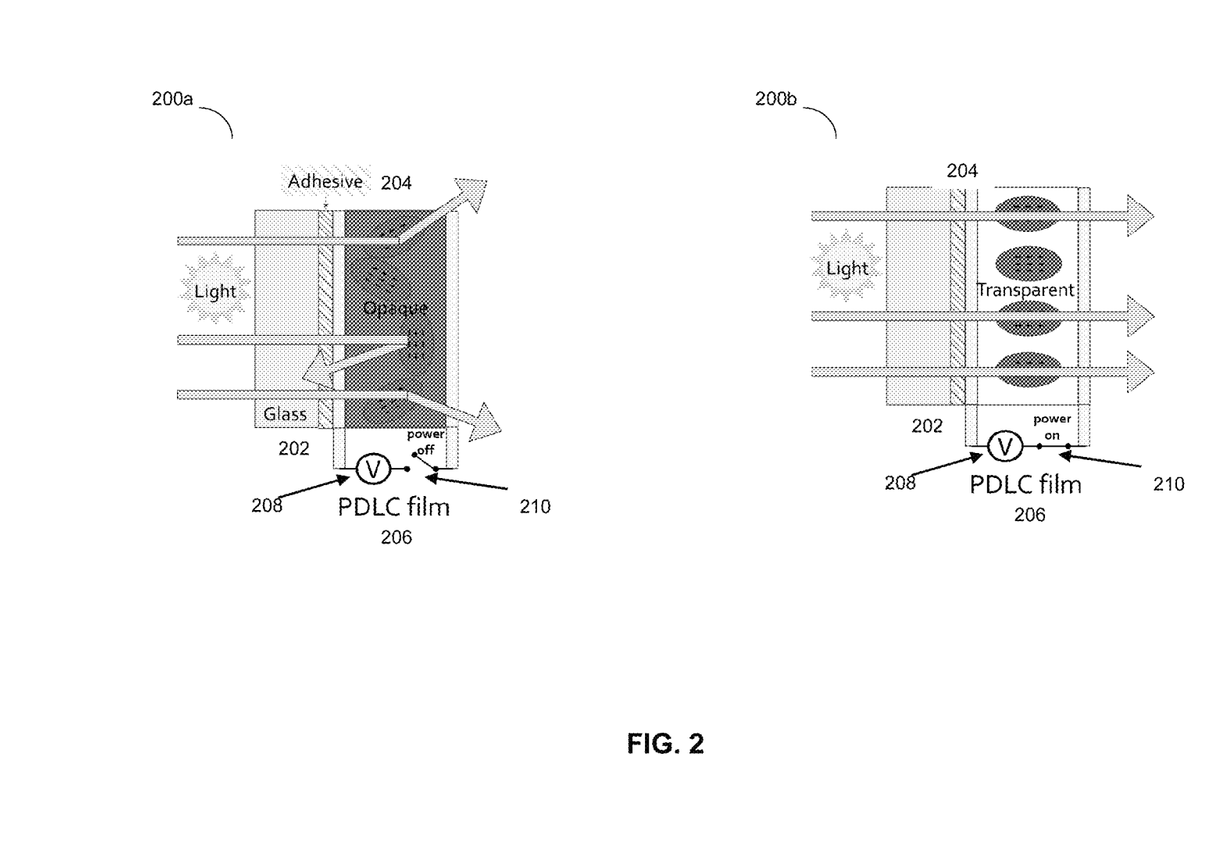
FIG. 2 is a simplified diagram illustrating properties of exemplary electrochromic films containing polymer-dispersed liquid crystals ("PDLC"), in accordance with some embodiments.

FIG. 2 is a simplified diagram illustrating properties of an example electrochromic film system 200 in a turned-off state (as depicted by 200a) and in a turned-on state (as depicted by 200b). In the illustrated examples, the electrochromic film system 200 includes a glass layer 202, an adhesive layer 204, an electrochromic film device 206 (e.g., a film containing polymer-dispersed liquid crystals ("PDLC")), a power supply device 208, and a switch 210. The electrochromic film device 206 is applied and attached to the glass layer 202 with the adhesive layer 204. The power supply device 208 is connected to the electrochromic film device 206, the connection being controlled by the switch 210. In another example, the electrochromic film device 206 can be a suspended-particle device (SPD), in which a thin film laminate of rod-like nano-scale particles are suspended in a liquid and placed between two pieces of glass and/or plastic, or attached to one layer. In a further example, the electrochromic film device 206 contains micro-blinds composed of rolled thin metal blinds on glass, thus controlling the amount of light passing through in response to applied voltage. In some examples, blinds that can be mechanically turned are applied to the glass. Without using any electrochromic device, a processor can control (e.g., via a servo motor) the blinds to switch the glass between a transparent state and an opaque state.

When the switch 210 is turned off, there is no electricity going through the electrochromic film device 206. As a result, due to the electrical properties of PDLC film, the liquid crystals in the electrochromic film device 206 are oriented in random different directions, and thus unaligned. In this case, light traveling through the glass layer 202 would reflect off or refract through the electrochromic film device 206, resulting in the electrochromic film device 92 appearing opaque. When the switch 210 is turned on, there is electricity going through the electrochromic film device 206. As a result, the liquid crystals in the electrochromic film device 206 are all aligned in the same direction, allowing the light to pass through the film and making the electrochromic film device 206 appear transparent.

Figure 3:
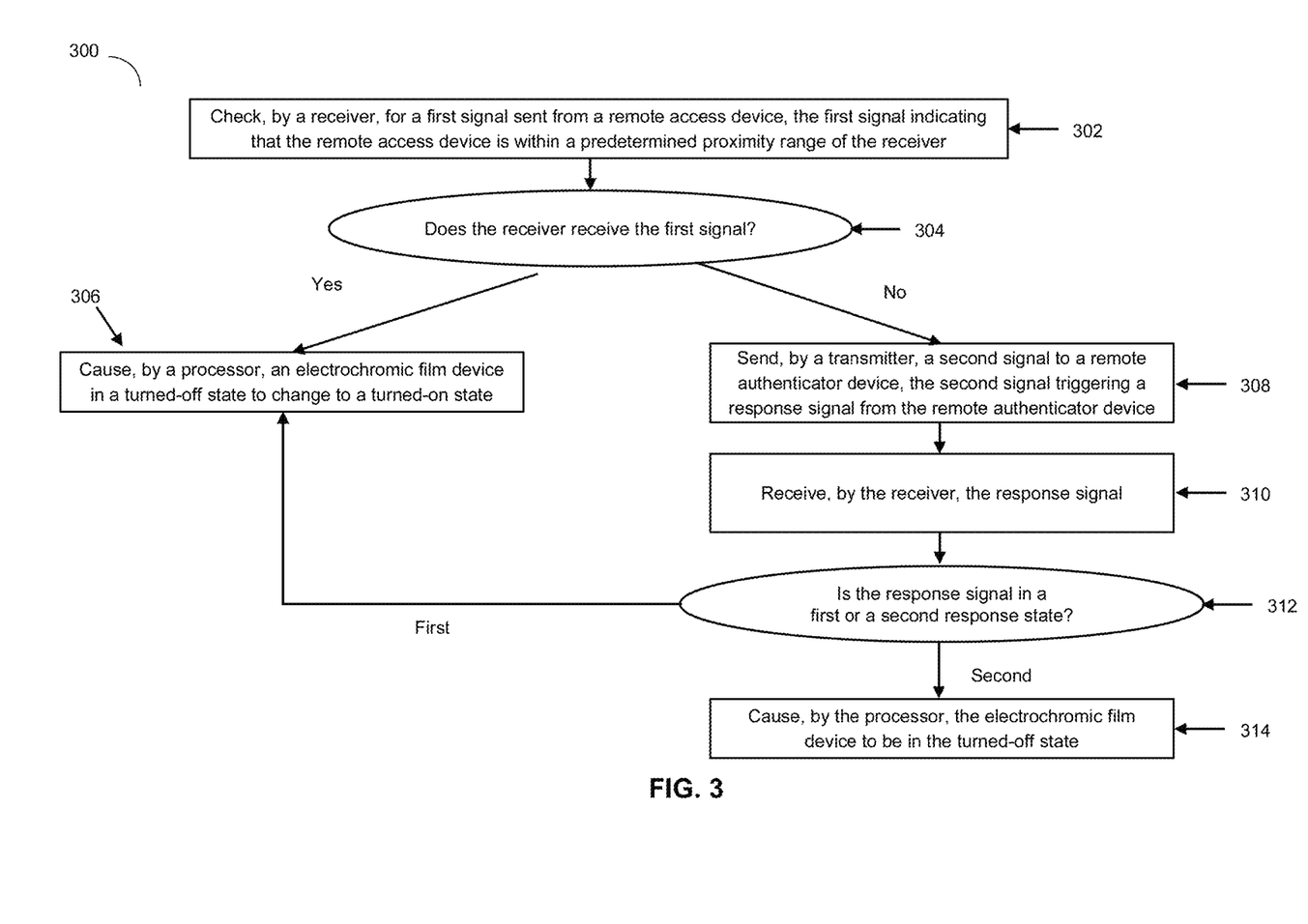
FIG. 3 is a flow chart illustrating an exemplary method for vehicle security control, in accordance with some embodiments.

FIG. 3 illustrates an exemplary method 300 for vehicle security control. In the illustrated example, the method 300 includes steps 302, 304, 306, 308, 310, 312, and 314. At step 302, a receiver checks for a first signal sent from a remote access device, the first signal indicating that the remote access device is within a predetermined proximity range of the receiver. The receiver attempts to detect the first signal and would be able to receive the first signal if the remote access device is within a predetermined proximity range of the receiver. Thus, when the receiver receives the first signal sent from the remote access device, it is indicated that the remote access device is present within the predetermined proximity range of the receiver. The receiver is able to communicate to a processor, which determines at step 304 whether the receiver receives the first signal.

When the result to step 304 is in the affirmative, the processor causes an electrochromic film device in a turned-off state to change to a turned-on state at step 306. The turned-on state allows electricity to flow through to the electrochromic film. As a result, the electrochromic film turns transparent and visibility through the electrochromic film is allowed.

In some examples, at step 306, the processor is configured to cause the electrochromic device to be in the turned-on state when, in addition to receiving the first signal, the receiver also receives a response signal from a remote authenticator device indicating an authorization (as described below at steps 308, 310, and 312). Otherwise, the processor is configured to cause the electrochromic device to remain in the turned-off state.

When the result to step 304 is in the negative, a transmitter sends a second signal to a remote authenticator device at step 308. The second signal triggers a response signal, which indicates either a first response state (e.g., an affirmative answer or an authorization, etc.) or a second response state (e.g., a negative answer or no authorization, etc.), from the remote authenticator device. At step 310, the receiver receives the response signal. Then the processor determines, at step 312, whether the response signal received by the receiver indicates the first response state or the second response state.

When the result to step 312 is the first response state, the processor causes the electrochromic film device in the turned-off state to change to the turned-on state, as in step 306. When the result to step 312 is the second response state, the processor causes the electrochromic film device to be in the turned-off state. Hence, the electrochromic film device is opaque and visibility through the electrochromic film is obscured.

In another embodiment, the example method 300 also comprises causing, by the processor, a power supply device to be connected to the electrochromic film device. With the electricity power provided by the power supply device, the electrochromic film device is operable to switch between the turned-off state and the turned-on state under the control of the processor. In various implementations, the power supply device is disposed in various locations.

In yet another embodiment, the power supply device is disposed in a vehicle start system. The example method 300 further comprises connecting the power supply device, via an interface device, to the receiver, the transmitter, and the processor. With the connection, the power supply device provides electricity power to other components including the electrochromic film device. In the other direction, when the receiver receives the response signal indicating the second response state, the processor controls, via the interface device, the power supply device of the vehicle start system to shut down. As a result, the electrochromic film device is kept in the turned-off state while the vehicle start system is shut down.

Figure 4:
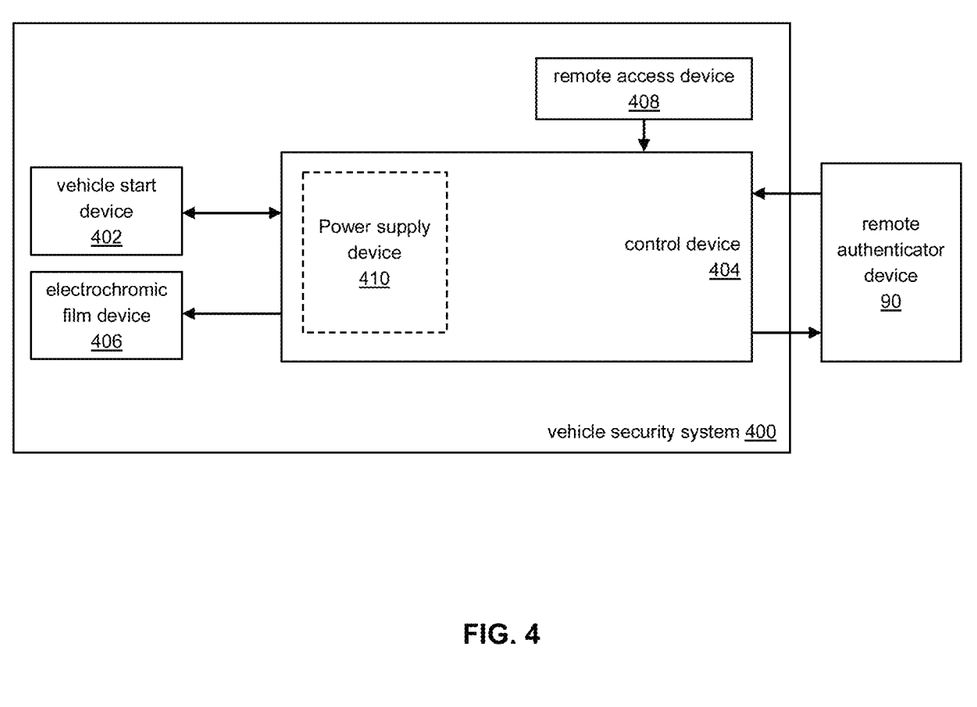
FIG. 4 is a block diagram illustrating another exemplary system for vehicle security control, in accordance with some embodiments.

FIG. 4 illustrates an example vehicle security system 400. In the illustrated example, the vehicle security system 400 is in communication with the remote authenticator device 90 (illustrated and described in FIG. 1). The example vehicle security system 400 includes a vehicle start device 402, a control device 404, an electrochromic film device 406, and a remote access device 408. The control device 404 is in communication with the vehicle start device 402, the electrochromic film device 406, the remote access device 408, and the remote authenticator device 90. In some implementations, the control device 404 includes a power supply device 410. In other implementations, the power supply device 410 is disposed in other locations, inside of and/or outside of the vehicle security system 400. In some implementations, the control device 404 is disposed near a dashboard of a vehicle.

Examples of the vehicle start device 402 include an engine starter circuit, an ignition interlock, and the like. These vehicle start devices work in combination with, for instance, an ignition key. When the ignition key is turned to a start position, the vehicle start device makes the engine of a vehicle to start running. These vehicle start devices can also involve a push button to start the engine or the like. Some vehicle start devices are armed with security features with sensing mechanisms. If a security issue is sensed, the vehicle start device restricts the vehicle's engine from being started. When the vehicle start device 402 is in an activated state (e.g., started by an ignition key), the vehicle start device 402 powers up other components of the vehicle including the control device 404 by supplying electricity through electrical connections. In turn, the control device 404 powers up the electrochromic film device 406 by supplying electricity through electrical connections. When the control device 404 is not itself powered up, the electrochromic film device 406 is in a turned-off state without electricity supplied. When the control device 404 is powered up, the electrochromic film device 406 is operable to switch between the turned-off state and a turned-on state under the control of the control device 404.

The remote access device 408 is configured to be paired with the control device 404. After the pairing process is complete, the remote access device 408 is configured to send a first signal identifying and/or locating the remote access device 408. The control device 404 is configured to detect the first signal if the remote access device 408 is within a predetermined proximity range of the control device 404. Thus, when the control device 404 receives the first signal sent from the remote access device 408, it is indicated that the remote access device 408 is present within the predetermined proximity range of the control device 404.

When the control device 404 receives the first signal, the control device 404 controls the electrochromic film device 406, which is in an initial turned-off state, to change to a turned-on state. When the control device 404 does not receive the first signal, the control device 404 sends a second signal to the remote authenticator device 90. The second signal triggers the remote authenticator device 90 to prompt a question for the user of the remote authenticator device 90 to choose a response. For instance, the prompt asks the user whether the current activity regarding operations of the vehicle armed with the vehicle security system 400 is authorized. A response signal indicating the user's response is sent from the remote authenticator device 90 back to the control device 404.

When the response signal received by the control device 404 is determined to indicate a first response state (e.g., an affirmative response from the user or an authorization, etc.), the control device 404 controls the electrochromic film device 92 to change from the turned-off state to the turned-on state. When the response signal received by the control device 404 is determined to indicate a second response state (e.g., a negative response from the user or no authorization, etc.), the control device 404 controls the electrochromic film device 92 to remain in the turned-off state. In some examples, when the response signal received by the control device 404 is determined to indicate the second response state, the control device 404 controls the electrochromic film device 92 to change from the turned-on state to the turned-off state.

In another embodiment, when the control device 404 receives the response signal and determines that the response signal indicates the second response state, the control device 404 controls the vehicle start device 402 to shut down. As a result, the electrochromic film device 406 is kept in the turned-off state while the vehicle start device 402 is shut down.

FIG. 5A is a simplified diagram illustrating an exemplary implementation of electrochromic film for vehicle security. In the illustrated example, an electrochromic film device 504 is attached to a glass front windshield of a vehicle 502. In a state depicted by FIG. 5A, there is no electrical energy flowing through the electrochromic film device 504. Thus, the electrochromic film device 504 is operated in a turned-off state. As a result, the electrochromic film device 504 remains opaque not allowing most of the visible light through. Therefore, the visibility through the glass of the front windshield is obscured.

FIG. 5B is a simplified diagram illustrating an exemplary implementation of electrochromic film for vehicle security in a state different than the state depicted by FIG. 5A. In this illustrated example, the electrochromic film device 504 remains attached to the glass front windshield of the vehicle 502. In the state depicted by FIG. 5B, there is electrical energy that flows through the electrochromic film device 504 attached to the vehicle's front windshield. As a result, the electrochromic film device 504 is operated in a turned-on state which allows visible light through the electrochromic film device 504. In turn, normal visibility is allowed through the glass of the front windshield.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet. Specifically, the Controller Area Network ("CAN") system, which was first implemented in 1986 and has become a standard implementation for automobile electronics, are utilized for systems and methods in the current disclosure.

I claim:

1. A security control system comprising:
    a remote access device configured to send a first signal;
    a receiver installed in a vehicle configured to receive the first signal, indicating that the remote access device is within a predetermined proximity range of the receiver; and
    a processor in communication with the receiver, wherein the processor is configured to cause an electrochromic device attached to cover the entirety of a vehicle front windshield to be in a turned-on state in response to the receiver receiving the first signal, and to the processor successfully verifying a multi-factor authentication ("MFA") message received by the receiver,
    and wherein the electrochromic device when in a turned-off state is configured to obscure the entirety of the vehicle front windshield.

2. The system of claim 1, wherein the first signal is in response to an input from a user using the remote access device.

3. The system of claim 1, further comprising:
    a transmitter configured to send a second signal to a remote authenticator device, the second signal triggering a response signal from the remote authenticator device,
    wherein,
        when the receiver receives the response signal indicating an authorization, the processor is configured to cause the electrochromic device to be in the turned-on state,
        when the receiver receives the response signal indicating no authorization, the processor is configured to cause the electrochromic device to be in the turned-off state.

4. The system of claim 1, wherein the processor is configured to cause the electrochromic device to be in the turned-on state when, in addition to receiving the first signal, the receiver receives a response signal from a remote authenticator device indicating an authorization.

5. The system of claim 3, wherein the processor is further configured to cause a power supply device to be connected to the electrochromic device, the electrochromic device configured to be in the turned-on state when connected to the power supply device.

6. The system of claim 5, wherein when the receiver receives the response signal indicating no authorization, the processor is further configured to cause the power supply device to shut down.

7. The system of claim 5, wherein the electrochromic device is in the turned-off state when the power supply device is shut down.

8. The system of claim 1, wherein the electrochromic device is an electrochromic film device.

9. A control method comprising:
receiving, by a receiver installed in a vehicle, a first signal sent from a remote access device, the first signal indicating that the remote access device is within a predetermined proximity range of the receiver; and
in response to the receiver receiving the first signal, causing, by a processor, an electrochromic device attached to cover the entirety of a vehicle front windshield to be in a turned-on state when the processor successfully verifies a multi-factor authentication ("MFA") message received by the receiver,
wherein the electrochromic device when in a turned-off state is configured to obscure the entirety of the vehicle front windshield.

10. The method of claim 9, wherein the first signal is in response to an input from a user using the remote access device.

11. The method of claim 9, further comprising:
sending, by a transmitter, a second signal to a remote authenticator device, the second signal triggering a response signal from the remote authenticator device;
receiving, by the receiver, the response signal;
in response to the response signal indicating an authorization, causing, by the processor, the electrochromic device to be in the turned-on state; and
in response to the response signal indicating no authorization, causing, by the processor, the electrochromic device to be in the turned-off state.

12. The method of claim 9, wherein the processor is configured to cause the electrochromic device to be in the turned-on state when, in addition to receiving the first signal, the receiver receives a response signal from a remote authenticator device indicating an authorization.

13. The method of claim 11, further comprising causing, by the processor, a power supply device to be connected to the electrochromic device, the electrochromic device configured to be in the turned-on state when connected to the power supply device.

14. The method of claim 13, further comprising:
when the receiver receives the response signal indicating no authorization, causing, by the processor, the power supply device to shut down.

15. The method of claim 9, wherein the electrochromic device is an electrochromic film device.

16. A vehicle security system, comprising:
a vehicle start device configured to cause, when in an activated state, a vehicle engine to start;
a control device in communication with the vehicle start device, the control device being powered up by the vehicle start device in the activated state;
an electrochromic device attached to cover the entirety of a vehicle front windshield, the electrochromic device being in communication with the control device and configured to be in a turned-off state to obscure the entirety of the vehicle front windshield when the control device is not powered up; and
a remote access device configured to send a first signal, wherein the control device is configured to:
check for the first signal sent from the remote access device; and
when the control device receives the first signal with a receiver installed in a vehicle, indicating that the remote access device is within a predetermined proximity range of the receiver, and successfully verifies a multi-factor authentication ("MFA") message received by the receiver, change the electrochromic device in the turned-off state to a turned-on state.

17. The system of claim 16, wherein the first signal is in response to an input from a user using the remote access device.

18. The system of claim 16, wherein the control device is further configured to, when the control device does not receive the first signal:
send a second signal to a remote authenticator device, the second signal triggering a response signal from the remote authenticator device;
receive the response signal;
in response to the response signal indicating an authorization, change the electrochromic device from the turned-off state to the turned-on state; and
in response to the response signal indicating no authorization, maintain the electrochromic device in the turned-off state.

19. The system of claim 16, the control device further comprising a power supply device in connection with the electrochromic device, wherein the electrochromic device is configured to be in the turned-on state when the power supply device is powered up by the vehicle start device in the activated state.

20. The system of claim 16, wherein when the receiver receives the response signal indicating no authorization, the control device is further configured to cause the vehicle start device to shut down to be in a deactivated state.

* * * * *